United States Patent [19]

Spies

[11] Patent Number: 5,247,296
[45] Date of Patent: Sep. 21, 1993

[54] DEVICE FOR DETERMINATION OF DISTANCES BETWEEN CLOSE-RANGE OBJECTS

[75] Inventor: Hans Spies, Pfaffenhofen, Fed. Rep. of Germany

[73] Assignee: Messerschmitt-Bolkow-Blohm GmbH, Munich, Fed. Rep. of Germany

[21] Appl. No.: 884,413

[22] Filed: May 12, 1992

Related U.S. Application Data

[63] Continuation-in-part of Ser. No. 547,292, Jul. 3, 1990, abandoned.

[30] Foreign Application Priority Data

Jul. 5, 1989 [DE] Fed. Rep. of Germany ....... 3922085

[51] Int. Cl.$^5$ ............................................. G08G 1/16
[52] U.S. Cl. ................................. 340/903; 340/435; 340/555; 342/52; 342/118; 180/167
[58] Field of Search ............... 340/903, 436, 902, 901, 340/435, 555; 342/53, 54, 70, 455, 52, 118; 180/167; 359/109, 111, 143, 145, 154, 155

[56] References Cited

U.S. PATENT DOCUMENTS

| 3,891,966 | 6/1975 | Sztankay | 340/903 |
| 4,026,654 | 5/1977 | Beaurain | 340/903 |
| 4,694,295 | 9/1987 | Miller et al. | 340/903 |
| 4,766,421 | 8/1988 | Beggs et al. | 340/903 |
| 4,833,469 | 5/1989 | David | 340/903 |
| 4,849,731 | 7/1989 | Melocik | 340/903 |
| 4,891,624 | 1/1990 | Ishikawa et al. | 340/436 |

FOREIGN PATENT DOCUMENTS

3640449 6/1988 Fed. Rep. of Germany .

Primary Examiner—Donnie L. Crosland
Attorney, Agent, or Firm—McGlew and Tuttle

[57] ABSTRACT

Device for determining distances in the close range (under 100 m), hereby characterized in that both light pulses and high-frequency pulses are transmitted and received and the correct distance is determined in an evaluating device in a simple way and with reliability under nearly all atmospheric conditions.

11 Claims, 5 Drawing Sheets

DEVICE FOR DETERMINATION OF DISTANCES BETWEEN CLOSE-RANGE OBJECTS

This is a continuation-in-part application of application Ser. No. 07/547,292 filed Jul. 3, 1990, now abandoned.

FIELD OF THE INVENTION

The invention refers generally to a device for determining distances between two close-range (less than 100m) objects and more particularly to a device and system for determining distances between two objects which move relative to one another, such as two motor vehicles, whereby the first object includes a light-pulse transmitter and receiver, and an evaluating circuit for determining the distance based on the propagation time of the transmitted light-pulse which is received after being reflected by a second object. More specifically the present invention relates to a device that sends out two pulses of different frequencies at the same time.

BACKGROUND OF THE INVENTION

German Patent 3,640,449, issued to the applicant, discloses a general device of this type. The device of this patent operates independently of atmospheric influences, as much as possible. The device is suitable for extracting useful signals from the very noisy background of the received signals for an accurate distance determination.

SUMMARY AND OBJECTS OF THE INVENTION

It is an object of the present invention to essentially increase the reliability or provide greater reliability in determining distance between two objects which move relative to each other, particularly two motor vehicles in close range, without at the same time increasing the costs of such a device.

According to the invention, a light-pulse transmitter is provided with a receiver and an evaluating circuit for determining the distance between an object such as a vehicle and a second object based on the propagation time of the transmitted light-pulse which is subsequently received after being reflected by the second object. The transmitter arrangement transmits a high frequency pulse in addition to the transmission of the light-pulse. The high frequency pulse is received by means of the same or a separate antenna. After the transmitted high frequency pulse has been back scattered, the received signal may be amplified and/or delayed. Then it may be introduced into the evaluation circuit and to the same signal processor which is provided for the optical signal. The evaluation circuit can be processor-controlled, as described in German Patent 3,640,449, but also an evaluating logic or plausibility logic known in and of itself can be employed.

The essential advantage of the invention lies in the fact that although the reliability of the distance measurement in the sensitive close region (less than 100 m) is appreciably improved, the cost of the device is not correspondingly increased. This can be achieved particularly due to the fact that the transmission and reception of both the light pulses as well as the high-frequency pulses can be achieved by the same units. A reliable distance indication is possible, even in the sensitive close range between 1 and 20 meters, by means of a common channel and comparison of measured back-scattered signal paths, without the cost of, e.g., two transmitters and two receivers and the correspondingly separated processing channels.

In this way, it is possible according to the invention to provide a device for determining distances in the close range. According to the invention if a predetermined distance between two objects, which move relative to each other, e.g., between two vehicles or between a vehicle and an object, is surpassed (i.e. if the vehicle and object come closer than the predetermined distance), a warning signal is produced immediately and/or a tripping step is triggered. The tripping could trigger a retaining system, e.g., an air bag inflated by means of a known gas generator or a retaining belt tightened by means of a belt tightener. In addition, other measures for avoiding collision can be triggered, such as disconnection of the engine, activation of the brake, or warning blinkers, warning lights, warning acoustic signals, or other warning signals can be triggered, or buffer and shock absorbers can be actuated (brought into active position).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
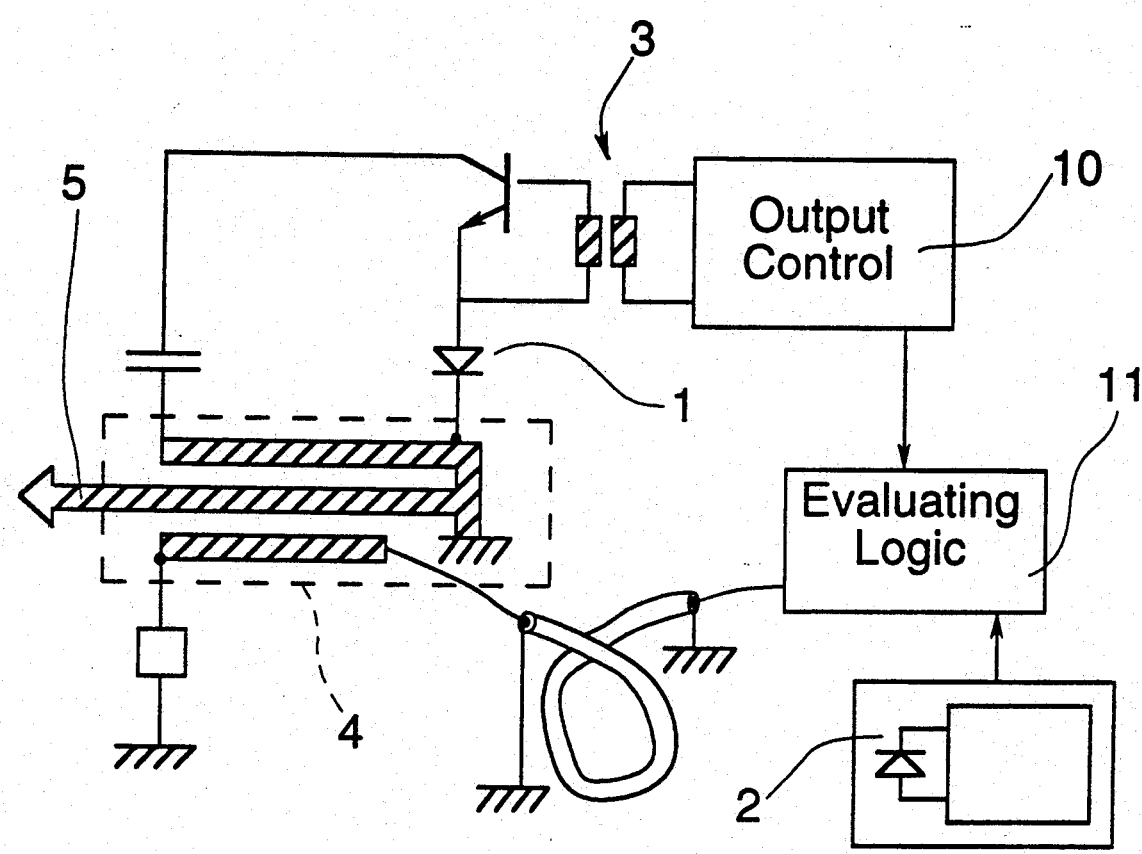
FIG. 1 is an electronic schematic of the light and high frequency transmitters and receivers.

Referring to the drawings in particular the invention provides a pulse generator 3 (half-width value of approximately 1–50 ns) for firing a laser diode 1. The pulse generator 3 can be a pulse transformer with a pulse transistor as shown in FIG. 1. The firing of the laser diode produces a high-frequency pulse in the signal control current of the laser diode. This high-frequency pulse contains frequencies in the range of approximately 50 MHz up to approximately 60 GHz and this high-frequency pulse is generated periodically with the firing of the laser diode 1. A stripline circuit 4 is coupled to the transmitting pulse generator 3. The stripline circuit 4 receives the high-frequency pulse from the transmitting pulse generator 3 and radiates the high frequency pulse by means of an antenna 5.

The high-frequency pulse signals, backscattered from the object to be detected, are received by the same antenna 5. The light pulse is received by optical receiver 2. Both signals can be brought to the same signal processor (dual gate or adaptive signal processing as described further below) for evaluation.

Figure 2:
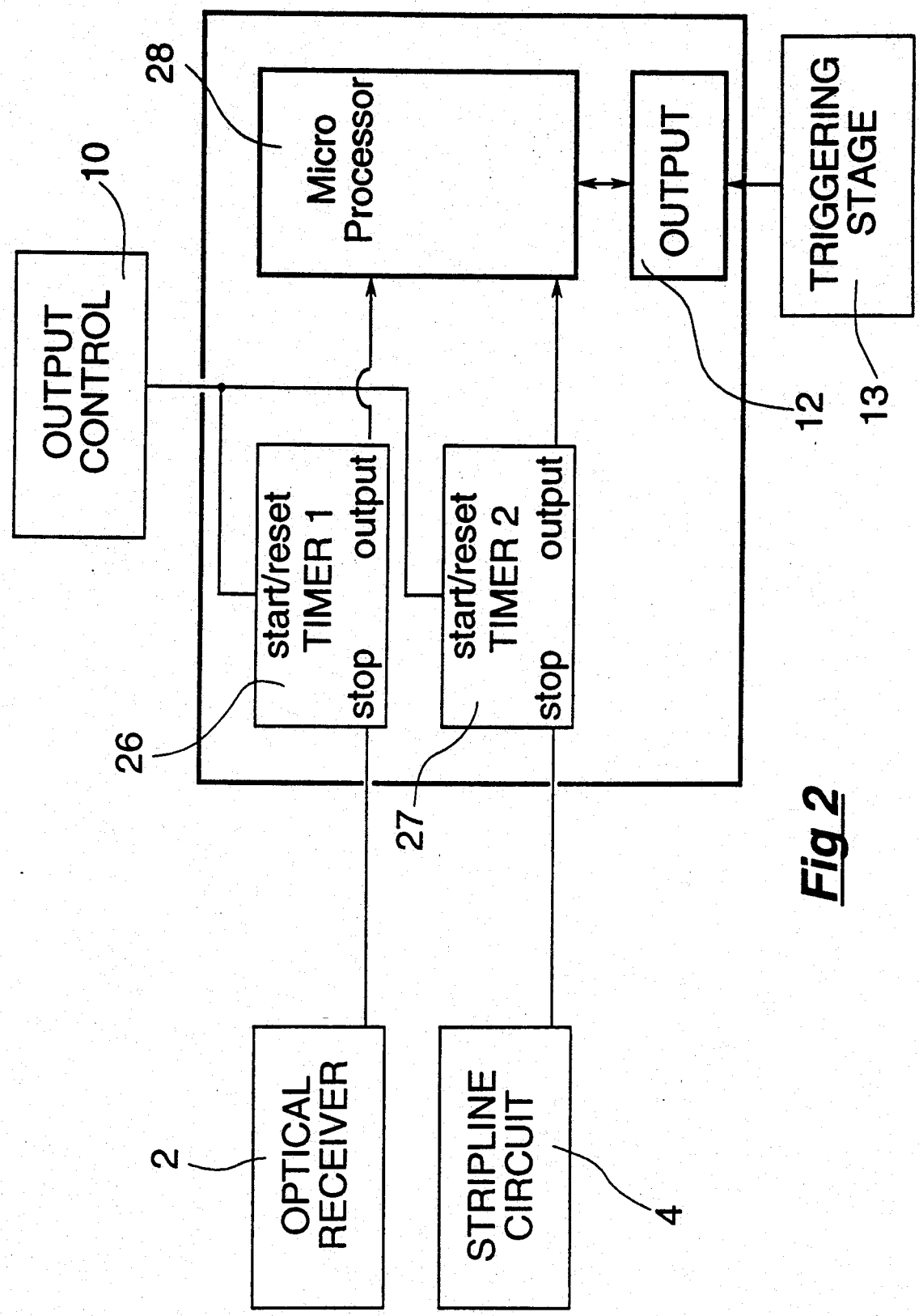
FIG. 2 is a block diagram of the evaluating logic.

A processing method as described with reference to FIG. 2 can be used to determine the distance of the detected object. When the output control 10 initiates a pulse to the transmitting pulse generator 3 a signal is also sent to the evaluating logic 11. In the evaluating logic 11 the signal from the output control 10 starts a first timer 26 and second timer 27 (see FIG. 2). When the reflected light pulse is received by the optical receiver 2, another signal is sent to the evaluating logic 11 by the optical receiver and this signal stops the first timer. Then by knowing the propagation time of light, the distance traversed by the light pulse can be calculated by the microprocessor 28. The elapsed time from the first timer 26 is read by the microprocessor 28 and divided by the propagation time. This gives the round trip distance from the transmitter to the object to be detected. The round trip distance is further divided by two (2) in order to determine the distance between the transmitter and the object to be detected.

The received backscattered high-frequency pulse is sent through the stripline circuit 4 and can be either be sent to the evaluating logic 11 along the same path as the signal from the optical receiver or along a different path. If sent along a different path the received backscattered high-frequency pulse stops the second timer 27 and the microprocessor 28 reads the second timer and calculates the distance in a similar as the first timer 26.

Figure 3:
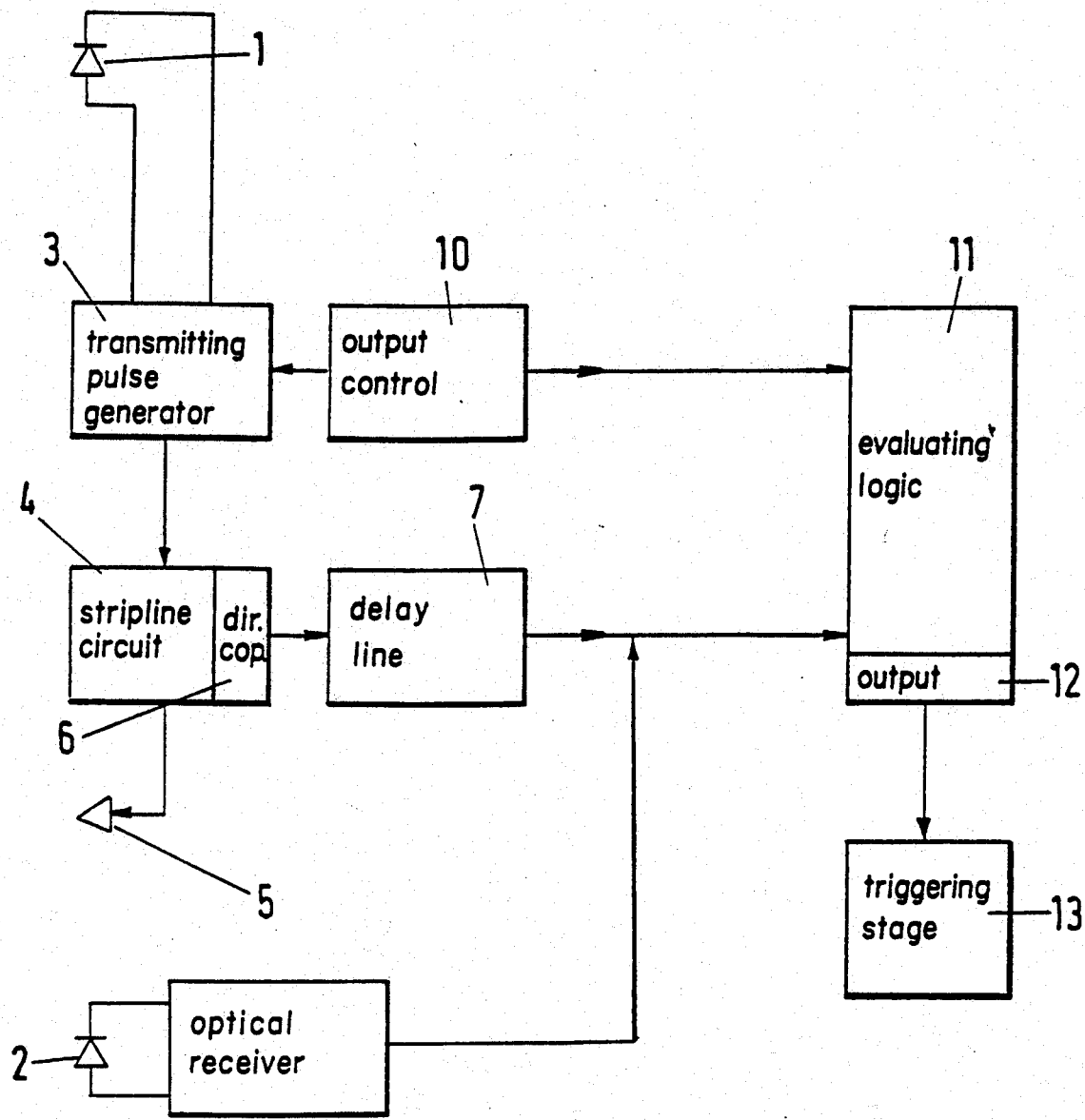
FIG. 3 is a block diagram of the general processing steps according to the invention.
Figure 4:
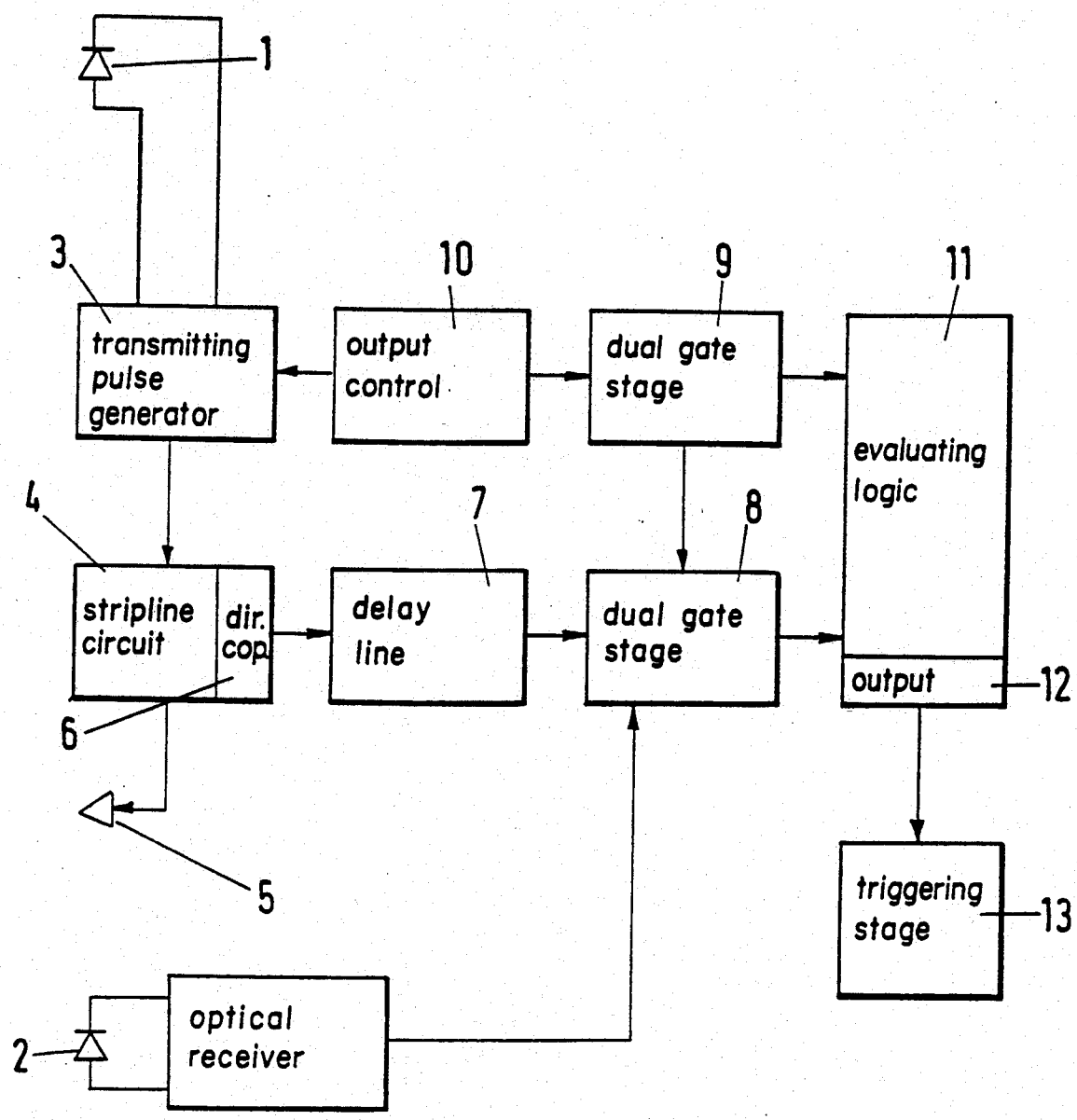
FIG. 4 is a block diagram of the processing steps having a stage for reducing noise errors or determining if a specific distance has been reached.

If the back scattered high-frequency pulse is sent along the same path as the reflected light pulse then the high-frequency pulse can be either amplified or delayed to prevent the high-frequency pulse from interfering with the received light pulse. The evaluating logic then either has the first received pulse stop the first timer and the second pulse stop the second timer, or the larger pulse stops one timer and the smaller pulse stops the other. The embodiment using the same path and using the delay method is shown in FIGS. 3 and 4, while the embodiment using separate paths is shown in FIGS. 1 and 2. Independent of the path, the evaluating logic stops the second timer when it receives the back scattered high-frequency pulse. The evaluating logic measures the elapsed time on the second timer, subtracts the delay if needed and calculates the distance. The distance measured by both the light pulse and the high-frequency pulse are compared and used to produce a more accurate measurement. The distances measured can be averaged together or if one measurement is known to be more accurate a weighted average could be used to emphasize the more accurate measurement.

Instead of starting or stopping timers a series of consecutively enabled integrators can be used as described in U.S. Pat. No. 3,824,592 (U.S. Pat. No. 3,824,592 is hereby incorporated by refence) to applicant. Here each integrator integrates a small portion of the reflected signal. The position of the integrator with the largest value indicates the point in time when the reflected signal was received.

In either way the propagation time of the high-frequency and light pulse can be compared or determined and a distance measurement carried out. The obtained distance measurements are compared in the evaluating logic 11 for the optical and high-frequency pulses, and a reliable distance indication or measurement for a rigidly established distance is determined which is more accurate than either one of the individual measurements. This increase in accuracy is easily gained without the normally associated costs needed for another measurement device. The transmitter for the high-frequency pulse is created by only adding a small addition to the light pulse transmitter and the same evaluating logic is used for both the light and high-frequency pulses.

A device for determining close-range distances is shown as an example in the FIG. 4. Here a laser diode serves as the optical transmitter 1 and a PIN diode 2 serves as the optical receiver. High-frequency energy from the optical transmitter 1 is decoupled from a transmitting pulse generator 3 via a strip line circuit 4, which is connected to an aperiodic antenna 5 (e.g. and antenna with substantially constant impedance over a wide range of frequencies). A directional coupler 6 is assigned to strip line circuit 4 for distinguishing the input and output signals or the time course of the signals. These signals are amplified and/or delayed in a delay line 7 and input into a dual-gate stage 8. An identical dual gate stage 9 is connected with the output control 10 and the latter is connected with the transmitting pulse generator 3. Dual gate stages 8 and 9 are connected with the evaluating logic 11 and dual gate stage 8 is in turn connected to optical receiver 2. Output 12 is assigned to evaluating logic 11.

Very often the exact distance of the detected object is not necessary (for example the logic described in U.S. Pat. No. 3,824,592 provides distance information over a large range of distances), but only whether the detected object is within a certain predetermined distance. If the detected object is within a certain distance an output signal can be emitted from the evaluating logic. The output signal output can be produced, e.g., on a triggering stage 13 as a trigger signal for a safety system, such as a retaining system, if employed in the vehicle. At the retaining system, the trigger system, the trigger signal can turn on a gas generator in a known way, which inflates an air bag or tightens a belt. Of course, other measures may also be triggered. The application is not limited to motor vehicles.

Figure 5:
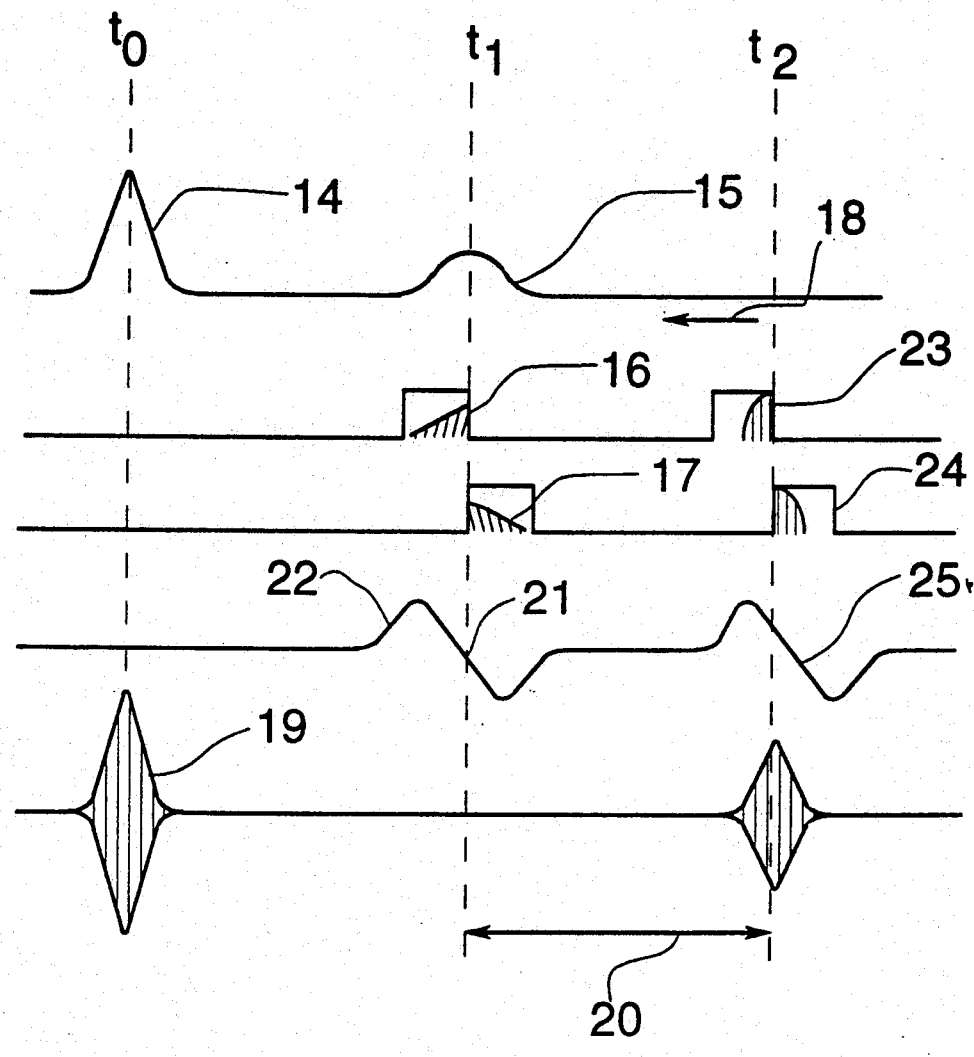
FIG. 5 shows graphical representations of the various signals of the invention.

FIG. 4 shows the processing steps of the invention with the additional steps of dual gate stages 8 and 9. Instead of having the evaluating logic constantly calculating distance and comparing the calculated distance with the predetermined distance, dual gate stages are used. In its simplest form a dual gate stage simply breaks apart a signal into two consecutive portions at a specific time. In FIG. 5 light pulse 14 is emitted at time $t_0$ and if the object is at the predetermined distance the reflected light pulse 15 returns at time $t_1$. When only determining if an object is inside a predetermined distance, this specific time of the dual gate stage is set at time $t_1$. The dual gate stage divides the reflected pulse signal 15 into an earlier portion 16 and a latter The end of the earlier portion 16 occurs at $t_0$ and the beginning of the latter portion 17 occurs at $t_0$. Each of these two portions are separately integrated. When an object is farther away than the predetermined distance the reflected light pulse 15 will be further to the right of $t_0$ and if it is far to the right of $t_0$ no segment of the reflected light pulse will be in either portion. As the object gets closer to the predetermined distance, the reflected light pulse 15 approaches $t_0$ from the right as shown by arrow 18. During this approach the latter portion will first contain a segment of the reflected light pulse. After integrating both portions the latter portion 17 will have a higher value. As the reflected light pulse 15 moves further to the left the earlier portion 16 also starts to contain a segment of the reflected light pulse. When the center of the reflected light pulse 15 is in the center of the latter portion 17, the integrated value of latter portion 17 will be at its highest. Then as the center of the reflected light pulse 15 moves away from the center of latter portion 17 and toward time $t_0$, the integrated value of portion 17 starts to decrease and the integrated value of earlier portion 16 is still increasing. When the center of reflected light pulse 15 is at to the reflected light pulse 15 will be in both portions. When the reflected light pulse 15 is substantially equally divided in both portions with the peak of the reflected light pulse being at the end of the earlier portion 16 and the beginning of the latter portion 17. At this point the object is at the predetermined distance and the integrated values for both portions 16 and 17 are substantially equal. If the object is closer than the predetermined distance the reflected light pulse signal will be in the earlier portion 16 and the corresponding integration value for the earlier portion 16 will be larger.

If the integrated value of latter portion 17 is subtracted from earlier portion 16 a combination signal 22 results. It is very easy for the evaluating logic 11 to recognize this signal and determine the zero crossing point 21 which signifies that the object is at the predetermined distance. The evaluating logic in this case basicly determines which integrated value is larger and if the latter portion 17 is larger, then the evaluating logic monitors the integrated values or the combination signal 22. At the point when the two integrated values are equal or there is a zero crossing 21, the evaluating logic then generates the output signal indicating that the object is at the predetermined distance.

The same processing can be used for processing the high-frequency pulse. The high-frequency pulse is also radiated at time $t_0$ and it would normally also return at time $t_0$. However if the same evaluating path is used for both the light pulse and the high-frequency pulse then a delay 20 can be added to the high-frequency pulse and the dual gate stage processing performed at time $t_2$ with portions 23 and 24, and combination signal 25.

Very often systems such as the present invention are used in weather conditions such as fog or rain and this causes the backscattered signal to be very noisy. In a very noisy signal the exact time of receiving the back scattered signal is harder to determine and very subject to errors. The above methods using integration overcome much of the noise problem, and the dual gate stages can be used in the integrators as described with reference to U.S. Pat. No. 3,824,592 for an even more accurate system.

In FIG. 4 dual gate stage 8 divides both the signal from the high-frequency receiver and the optical receiver. These two signals are time delayed with respect to each other and each signal can therefore be divided into two portions at the specific time when each reflected signal indicates the object is at the predetermined distance. The evaluating logic 11 then performs the integration and comparisons.

Dual gate stage 9 can be used to divide the signal coming from the output control 10. This signal from the output control indicates the transmission of the light and high-frequency pulses and dual gate stage 9 can repetitively divide up this signal in order to determine the exact time the pulses were transmitted. A signal then can also be sent to the dual gate stage 8 indicating that pulses have been transmitted and the dual gate stage 8 can then determine when to divide the signals from the high-frequency and optical receivers.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which a preferred embodiment of the invention is illustrated.

What is claimed is:

1. A device for determining distances between two objects, the device comprising:
    a pulse generator on the first object;
    optical transmission means connected to said pulse generator, for transmitting light-pulses;
    decoupling means for decoupling high-frequency energy from said optical transmission means and radiating said high-frequency energy via a connected antenna, said antenna also receiving said high-frequency energy after said high frequency energy is backscattered by the second object;
    optical receiver means for receiving light-pulses reflected by the second object; and
    evaluating logic means connected to said decoupling means and said optical receiver means for determining a distance between the first object and the second object, said evaluating logic measuring a light pulse propagation delay time between said transmitted and received light pulse, said evaluating logic also measuring a high-frequency propagation delay time between said radiated and received high-frequency energy, said distance between the first object and the second object being calculated from said light pulse and high-frequency delay times and propagation times of said light pulse and high frequency energy.

2. A device according to claim 1, wherein:
    said coupling means includes a strip line circuit for coupling said high-frequency energy from said optical transmission means to said antenna.

3. A device according to claim 1, wherein:
    a directional coupler is connected to said antenna for distinguishing between radiated and received high-frequency energy or for distinguishing between pulses occurring over time.

4. A device according to claim 1, wherein said high-frequency pulses are introduced over a single channel to said evaluating circuit means.

5. A device according to claim 1, further comprising:
    trigger means for receiving a distance signal from said evaluating logic means and generating a trigger signal if said distance signal exceeds a predetermined level.

6. A device according to claim 1, wherein:
    said optical transmission means includes a strip line circuit for coupling said high-frequency energy from said pulse generator connected to said optical transmission means, said high-frequency energy periodically radiated by said antenna when said light-pulse is transmitted.

7. A device according to claim 1, wherein:
    a directional coupler is connected to said antenna for distinguishing between an radiated and received high-frequency energy.

8. A device according to claim 1, wherein:
    said received light-pulses and received high-frequency energy are introduced over a common signal channel to a dual gate stage associated with said evaluating logic means.

9. A system for determining close-range distances (smaller than 100 m) between two objects such as a vehicle provided with the system and another object, comprising:
- light-pulsed transmitter means for transmitting a light-pulse; light-pulse receiving means for receiving a reflected light-pulse and delivering a received light-pulse signal representative of said reflected light-pulse; high-frequency pulse transmitter means for transmitting a high-frequency pulse; high-frequency pulse receiver means for receiving a back scattered high-frequency pulse and delivering a back scattered high-frequency pulse signal representative of said back scattered high-frequency pulse; and, processor controlled evaluating logic means for receiving said reflected light-pulse signal and receiving said back scattered high-frequency pulse signal for determining a light-pulse distance measurement signal based on propagation time of a transmitted light-pulse and determining a high-frequency pulse distance measurement signal based on a propagation time of the high-frequency pulse.

10. A system according to claim 9, wherein:
- said light-pulse measurement signal and said high-frequency pulse measurement signal are compared, said evaluating circuit means delivering a signal based on the comparison of said light-pulse measurement signal and high-frequency measurement signal for forming an output signal; and, trigger means for receiving said output signal and generating a trigger signal if said output signal exceeds a predetermined level.

11. A device for determining close-range distances between two objects, the device being provided in a first object, the device comprising:
- an optical transmitter on the first object;
- a transmitting pulse generator connected to said optical transmitter for supplying pulsed energy to said optical transmitter for transmitting light-pulses;
- a strip line circuit connected to said transmitting pulse generator and connected to an antenna, high-frequency energy from said optical transmitter being decoupled by said transmitting pulse generator via said strip line circuit and said high-frequency energy being radiated by said antenna, said antenna also receiving said high-frequency energy after said high frequency energy is backscattered by the second object;
- a directional coupler connected to said strip line circuit for distinguishing between radiated and received high-frequency energy;
- output control means connected with said transmitting pulse generator for supplying a control signal to said transmitting pulse generator;
- an optical receiver for receiving a light-pulse reflected by the second object and supplying a received light-pulse signal;
- delay line means for delaying said received high frequency energy;
- a dual gate stage for receiving said received light-pulse signal and said delayed high-frequency energy, said dual gate stage dividing said received light-pulse signal and said received high-frequency energy into two portions at a specific time corresponding to a predetermined distance; and
- evaluating logic means connected to said dual gate stage and said output control means for determining a distance between the first object and the second object based on propagation time and delay time between each of said transmitted light-pulse and said received light pulse and between said radiated high-frequency energy and said received high-frequency energy, said evaluating logic means integrating each of said two portions of said light pulse signal and said received high-frequency energy, comparing integrated values for both of said portions, and determining when the second object is at said predetermined distance by first noticing when said integrated value of a latter portion is higher and then substantially equal to said integrated value of an earlier portion.

* * * * *